(12) United States Patent
Kumar et al.

(10) Patent No.: US 12,010,496 B2
(45) Date of Patent: Jun. 11, 2024

(54) METHOD AND SYSTEM FOR PERFORMING AUDIO DUCKING FOR HEADSETS

(71) Applicant: Apple Inc., Cupertino, CA (US)

(72) Inventors: Aarti Kumar, Los Altos, CA (US); Shehryar Lasi, San Francisco, CA (US); Baptiste P. Paquier, Saratoga, CA (US); Brian Clark, San Jose, CA (US)

(73) Assignee: Apple Inc., Cupertino, CA (US)

( * ) Notice: Subject to any disclaimer, the term of this patent is extended or adjusted under 35 U.S.C. 154(b) by 9 days.

(21) Appl. No.: 17/471,011

(22) Filed: Sep. 9, 2021

(65) Prior Publication Data
US 2022/0103948 A1 Mar. 31, 2022

Related U.S. Application Data

(60) Provisional application No. 63/083,773, filed on Sep. 25, 2020.

(51) Int. Cl.
| | |
|---|---|
| *H04R 5/033* | (2006.01) |
| *G10L 19/002* | (2013.01) |
| *H04L 65/70* | (2022.01) |
| *H04L 65/75* | (2022.01) |
| *H04R 3/04* | (2006.01) |
| *H04R 5/04* | (2006.01) |
| *H04W 4/80* | (2018.01) |

(52) U.S. Cl.
CPC .............. *H04R 5/04* (2013.01); *G10L 19/002* (2013.01); *H04L 65/70* (2022.05); *H04L 65/75* (2022.05); *H04R 3/04* (2013.01); *H04R 5/033* (2013.01); *H04W 4/80* (2018.02); *H04R 2420/07* (2013.01); *H04R 2430/01* (2013.01)

(58) Field of Classification Search
CPC . H04R 3/04; H04R 5/033; H04R 5/04; H04R 2420/07; H04R 2430/01; H04W 4/80; H04L 65/70; H04L 65/75; G10L 19/002
See application file for complete search history.

(56) References Cited

U.S. PATENT DOCUMENTS

| | | | |
|---|---|---|---|
| 6,466,832 B1 * | 10/2002 | Zuqert | H04R 5/04 700/94 |
| 6,965,804 B1 * | 11/2005 | Mercs | G11B 20/10527 381/119 |
| 8,428,758 B2 | 4/2013 | Naik et al. | |
| 10,779,105 B1 | 9/2020 | Clark et al. | |
| 2005/0195996 A1 * | 9/2005 | Dunn | H04R 25/554 381/105 |

(Continued)

*Primary Examiner* — Daniel R Sellers
(74) *Attorney, Agent, or Firm* — Aikin & Gallant, LLP

(57) ABSTRACT

A method performed by an audio source device. The method receives a first audio signal and a second, different audio signal and encodes the first audio signal and the second audio signal, wherein the first audio signal is encoded differently than the second audio signal. The method generates a first data packet that comprises the first encoded audio signal and a first volume level and a second data packet that comprises the second encoded audio signal and a second volume level, wherein the first volume level is lower than the second volume level and transmits, over a wireless connection, the first and second data packets as a dual audio stream to an audio output device.

21 Claims, 5 Drawing Sheets

(56) References Cited

U.S. PATENT DOCUMENTS

| | | | |
|---|---|---|---|
| 2010/0211199 A1* | 8/2010 | Naik | G10L 21/00 |
| | | | 700/94 |
| 2018/0332417 A1* | 11/2018 | Hartung | H03G 3/32 |
| 2020/0278828 A1* | 9/2020 | Murtaza | H04N 21/8106 |
| 2022/0248333 A1* | 8/2022 | Soulier | H04W 52/0254 |

* cited by examiner

METHOD AND SYSTEM FOR PERFORMING AUDIO DUCKING FOR HEADSETS

CROSS-REFERENCE TO RELATED APPLICATION

This application claims the benefit of and priority to U.S. Provisional Patent Application Ser. No. 63/083,773, filed Sep. 25, 2020, which is hereby incorporated by this reference in its entirety.

FIELD

An aspect of the disclosure relates to an audio source device that transmits several audio signals and metadata as a dual audio stream to an audio output device that ducks and mixes the audio signals together for output according to the metadata. Other aspects are also described.

BACKGROUND

Headphones are an audio device that includes a pair of speakers, each of which is placed on top of a user's ear when the headphones are worn on or around the user's head. Similar to headphones, earphones (or in-ear headphones) are two separate audio devices, each having a speaker that is inserted into the user's ear. Both headphones and earphones are normally wired to a separate playback device, such as an MP3 player, that drives each of the speakers of the devices with an audio signal in order to produce sound (e.g., music). Headphones and earphones provide a convenient method by which the user can individually listen to audio content without having to broadcast the audio content to others who are nearby.

SUMMARY

An aspect of the disclosure is a method performed by an audio source device (e.g., a multimedia device, such as a smartphone). The audio source device receives a first audio signal (e.g., playback audio, such as music) and a second, different audio signal (e.g., notification audio, such as a virtual personal assistant (VPA) response). The source device encodes the first audio signal and the second audio signal, where the first audio signal is encoded differently than the second audio signal. For instance, both audio signals may be encoded by compressing each of the audio signals at different compression bit rates, where the first audio signal is compressed at a lower compression bit rate than a compression bit rate the second audio signal. The audio source device generates a first data packet that includes the first encoded audio signal (e.g., as one or more playback audio frames) and a first volume level and a second data packet that includes the second encoded audio signal (e.g., as one or more notification audio frames) and a second volume level, where the first volume level is lower than the second volume level. For instance, both data packets may store their respective volume levels as metadata in headers. The audio source device transmits, over a wireless connection (e.g., BLUETOOTH connection), the first and second data packets as a dual audio stream to an audio output device (e.g., a wireless headset) that is configured to process the first and second encoded audio signals contained therein according to their respective volume levels to produce a mixed audio signal for output through a speaker.

In another aspect, the audio source device may dynamically adjust the compression of one or more of the audio signals (e.g., in real-time). For example, the audio source device may adjust the compression bit rate(s) based on the bandwidth or available throughput of the wireless (e.g., BLUETOOTH) connection with the audio output device. This wireless connection may fluctuate based on various conditions (e.g., based on the number of devices that are in wireless communication with the audio source device, based on environmental conditions, etc.). As the wireless connection changes, the audio source device may determine different compression rates in order to account for those changes. For example, the audio source device may determine that there is a reduction in available bandwidth for transmitting the dual audio stream over the wireless connection and adjust at least one of the first and second compression bit rates based on the reduction. As a result, the audio source device may change the compression bit rate of the first audio signal and/or of the second audio signal while streaming both signals to the audio output device.

According to another aspect of the disclosure, a method is performed by the audio output device. Specifically, the output device receives, over a wireless connection, the dual audio stream that is transmitted by the audio source device, and decodes the first and second encoded audio signals, respectively. Once decoded, the audio output device may store both decoded audio signals into different buffers. The audio output device may apply a first scalar gain associated with the first volume level received within the dual audio stream to the first decoded audio signal and may apply a second scalar gain associated with the second volume level received within the dual audio stream to the second decoded audio signal to generate first and second gain-adjusted audio signals, respectively. The audio output device drives the speaker with a mix of the first and second gain-adjusted audio signals.

In one aspect, the volume levels contained within the dual audio stream may be based on a user volume setting of the audio output device. Specifically, the user volume setting may be determined based on user input at the audio output device. For example, the audio output device may include an input device (e.g., a volume knob), which when adjusted by the user defines the user volume setting. The audio output device transmits, over the wireless connection, the user volume setting, where the first volume level may be less than the user volume setting and the second volume level is 1) greater than the first volume level and 2) less than or equal to the user volume setting.

The above summary does not include an exhaustive list of all aspects of the disclosure. It is contemplated that the disclosure includes all systems and methods that can be practiced from all suitable combinations of the various aspects summarized above, as well as those disclosed in the Detailed Description below and particularly pointed out in the claims. Such combinations may have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

DETAILED DESCRIPTION

Figure 1:
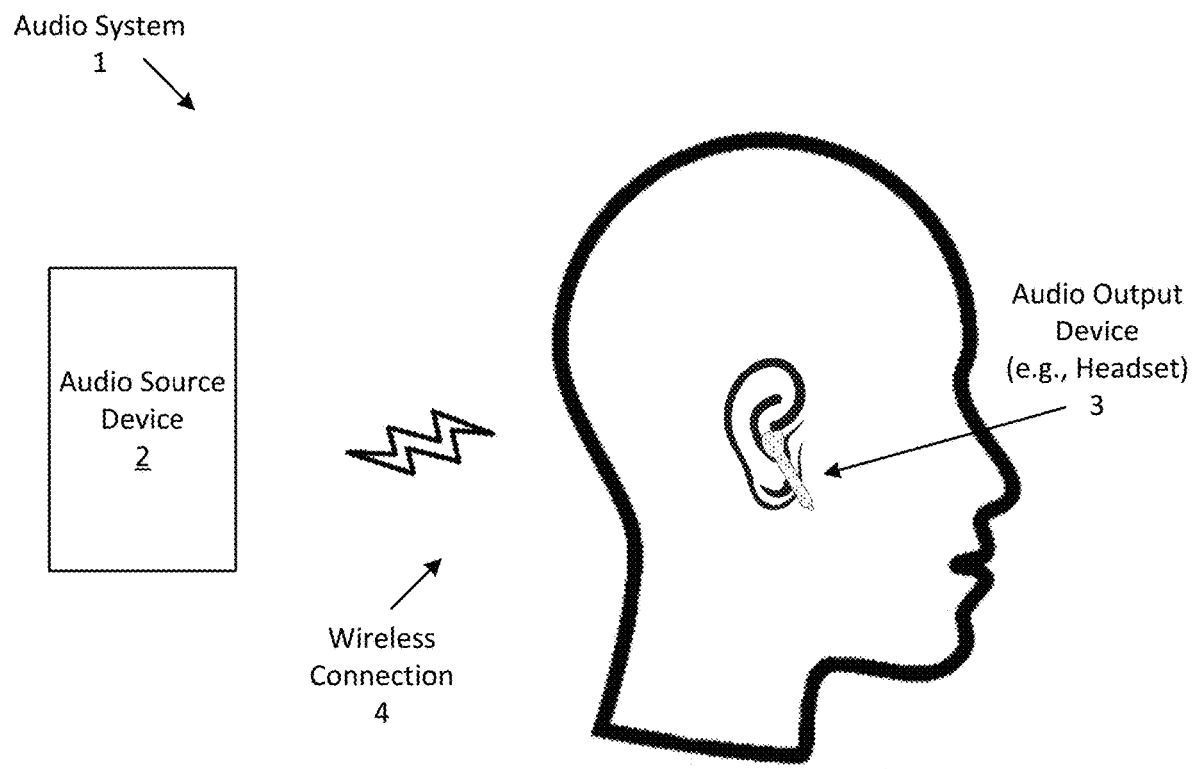
FIG. 1 shows an audio system that includes an audio source device and an audio output device.

Several aspects of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

Wireless communication capabilities are available in a broad array of accessory devices that can be configured to communication with an audio source device, such as a multimedia device (e.g., smart phone). For instance, wireless audio output devices, such as a wireless headset or a pair of wireless earphones, can connect via a wireless personal area network (WPAN) connection to the source device in order to receive an audio stream. In one aspect, the WPAN connection may be a BLUETOOTH connection using any BLUETOOTH communication protocol. To stream a high-quality playback audio signal (e.g., music), the audio source device packetizes the playback audio (e.g., partitions the data into units (or frames) for transmission) according to the protocol (e.g., Advanced Audio Distribution Profile (A2DP)), and transmits the packets over an over-the-air (or wireless) radio frequency (RF) signal to the wireless audio output device. The received packets are stored in a long buffer in the output device in order to provide continuous audio playback in situations when future packets are dropped (e.g., due to transmission interference). The playback audio data in the buffer are de-packetized and processed for audio output through one or more speakers. This process is repeated while audio output is desired at the audio output device.

When outputting the playback audio, it may be desirable to output different audio content. In particular, while streaming music, the audio source device may transmit notification audio (e.g., a virtual personal assistant (VPA) response) to the audio output device for playback. This may be performed in one of several methods. For example, the audio source device may cease transmitting the playback audio signal and in its place stream the notification audio as a notification audio signal to the audio output device for output. As a result, however, the listener of the audio output device may experience an abrupt pause of the music while the notification is played back. This abrupt pause may be undesirable. Instead, as another method the audio source device may stream a mix of the playback audio signal and the notification audio signal. In this case, the audio source device may first adjust each audio signal's gain differently, such that the playback audio has a lower volume than the notification audio. The audio source device then mixes both signals together to produce a mixed audio signal that may then be transmitted to the output device, which when played back transitions the playback audio to a lower volume while the notification audio is outputted at a higher volume than the current playback audio. This method, however, has drawbacks. For example, if the user were to change the volume setting (e.g., reduce the volume) while the notification is being played back, there would be significant latency between the time the volume is changed and when the user experiences the change in volume. In this case, once the volume setting is changed, although the audio source device may adapt the gain adjustment to the audio signals based on the changed volume setting, the audio output device will have to exhaust the long buffer of the mix that was produced and transmitted by the audio source device from before the volume setting was changed. As a result, the user may experience a significant undesirable latency, such as 200 milliseconds or higher before the change is experienced.

The present disclosure solves this problem by providing an audio system in which two individual audio streams are transmitted as a dual audio stream by the audio source device to the audio output device, rather than as a mixed audio signal. Specifically, the audio source device wirelessly transmits the dual audio stream that contains 1) at least one (first) data packet that contains the playback audio signal and 2) at least one (second) data packet that contains the notification audio signal. Each of the data packets may also include volume levels associated with each respective audio signal. In particular, the first data packet may include a first volume level for the playback audio signal and the second data packet may include a second volume level for the notification audio signal. The audio source device may transmit the dual audio stream to the audio output device, which is configured to process the audio streams contained therein according to their respective volume levels to produce a mixed audio signal for output. Thus, rather than the audio source device performing audio signal processing operations, such as ducking (e.g., applying scalar gains associated with their respective volume levels) to each individual audio signal, the audio output device may perform these operations, thereby reducing (or eliminating) latency due to the output device's buffer.

Conventional methods may be unable to wirelessly transmit multiple individual audio streams due to limited bandwidth of wireless connections, such as a BLUETOOTH connection between two devices. For example, some codecs, such as Advanced Audio Coding (AAC) may stream audio (e.g., stereo sound) at a bit rate between 256-345 Kbps (e.g., based on the sample rate). The present disclosure solves this problem by encoding (or compressing) each of the individual audio streams differently in order to satisfy the connection's bit rate. For instance, the audio source device may compress the playback audio signal more than the notification audio signal, such that the playback audio signal has a lower compression bit rate than a compression bit rate of the notification audio signal. By compressing the playback audio signal more, the audio source device is able to transmit both individual streams while not exceeding the limited bandwidth between the two devices.

FIG. 1 shows an audio system 1 that includes an audio source device 2 and an audio output device 3. In one aspect, the audio system may include other devices, such as a remote electronic server (not shown) that may be communicatively coupled to either the audio source device, the audio output device, or both, and may be configured to perform one or more operations as described herein. As illustrated, the audio output device is a headset that is arranged to direct sound into the ears of the wearer. Specifically, the headset is an earphone (or in-ear headphone or earbud) that is positioned on (or in) the user's right ear. In one aspect, the headset may include a pair of earphones, a left earphone for the user's left ear and a right earphone for the user's right ear. In this case, each earphone may be configured to output at least one audio channel of a playback (or program) audio (e.g., the right earphone outputting a right audio channel and the left earphone outputting a left audio channel of a two-channel input of a stereophonic recording, such as a musical work). In some aspects, the earphone may be a sealing type that has a flexible ear tip that serves to acoustically seal off the entrance of the user's ear canal from an ambient environment by blocking or occluding in the ear canal. In another aspect, the headset may be over-the-ear headphones that at least partially covers the user's ears. In some aspects, the headset may be on-ear headphones. In another aspect, the output device may be any electronic device that includes at least one speaker and is arranged to be worn by the user and arranged to output sound by driving the speaker with an audio signal.

In one aspect, the audio output device 3 may be any electronic device that is arranged to output sound into the ambient environment. As described herein, the device may be worn by (e.g., on a head of) the user. Other examples may include the output device being part of at least one of a stand-alone speaker, a smart speaker, a home theater system, or an infotainment system that is integrated within a vehicle. In another aspect, the audio output device may be any portable device, such as a tablet computer, a laptop computer, or a smartphone.

In one aspect, the audio source device 2 is a multimedia device, more specifically a smart phone. In another aspect, the audio source device may be any electronic device that can perform audio signal processing operations and/or networking operations. An example of such a device may include a tablet computer, a laptop, a desktop computer, a smart speaker, etc. In one aspect, the source device may be a portable device, such as a smart phone, as previously described. In another aspect, the source device may be a head-mounted device, such as smart glasses, or a wearable device, such as a smart watch.

As shown, the audio source device 2 is communicatively coupled to the audio output device, via a wireless connection 4. For instance, the source device may be configured to establish the wireless connection with the audio output device 3 via a wireless communication protocol (e.g., BLUETOOTH protocol or any other wireless communication protocol). During the established wireless (e.g., BLUETOOTH) connection, the audio source device may exchange (e.g., transmit and receive) data packets (e.g., Internet Protocol (IP) packets) with the audio output device, which may include audio digital data. For example, the audio output device may be paired with the audio source device such that the output device receives one or more audio streams for output through one or more speakers of the audio output device. More about streaming audio data by exchanging data packets is described herein.

In another aspect, the audio source device 2 may communicatively couple with the audio output device via other methods. For example, both devices may couple via a wired connection. In this case, one end of the wired connection may be (e.g., fixedly) connected to the audio output device, while another end may have a connector, such as a media jack or a universal serial bus (USB) connector, which plugs into a socket of the audio source device. Once connected, the audio source device may be configured to drive one or more speakers of the audio output device with one or more audio signals, via the wired connection.

In some aspects, the audio source device 2 may be a part (or integrated with) the audio output device 3. For example, as described herein, at least some of the components of the audio source device (such as one or more processors) may be a part of the audio output device. In this case, each of the devices may be communicatively coupled via traces that are a part of one or more printed circuit boards (PCBs) within the audio output device.

Figure 2:
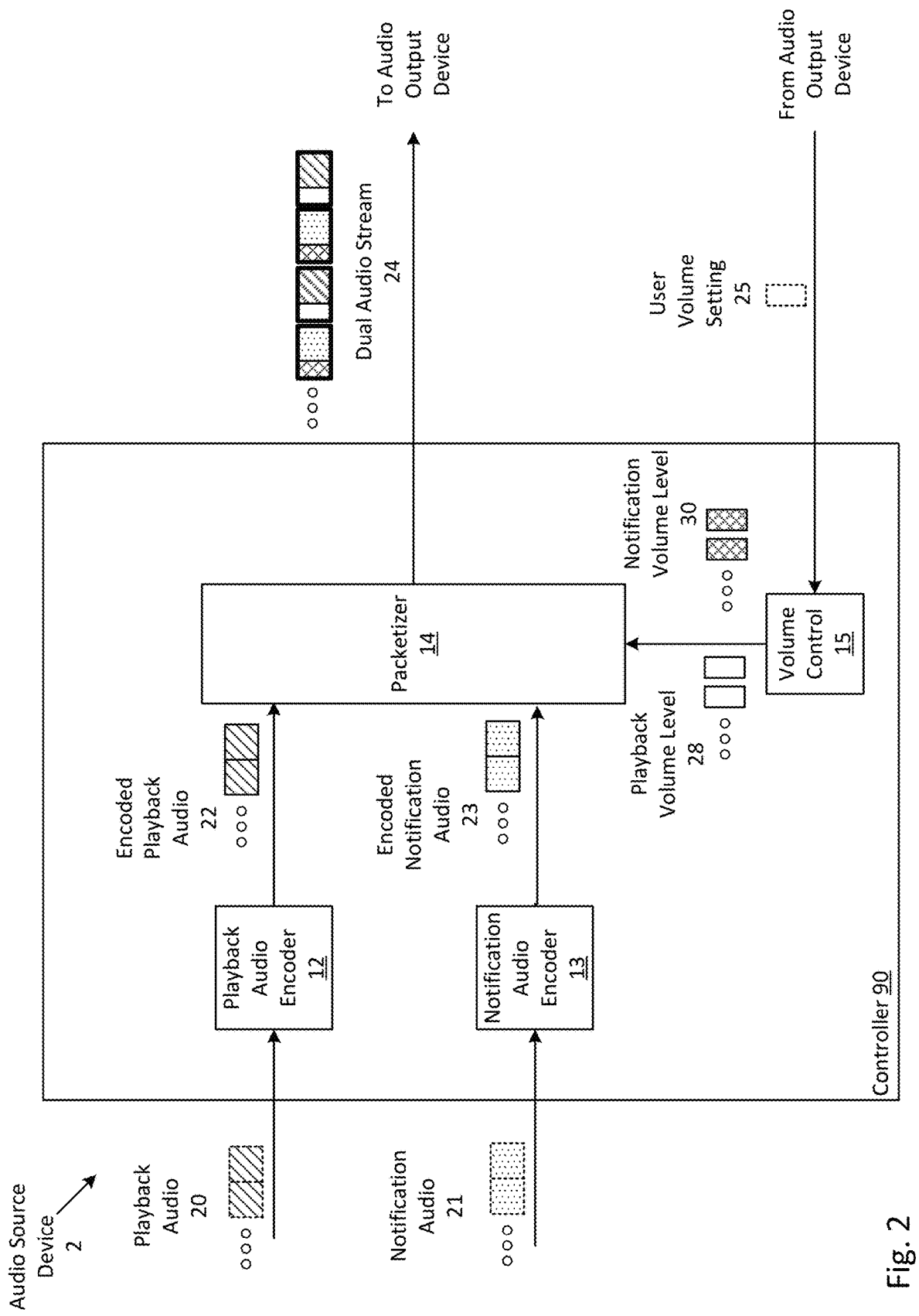
FIG. 2 shows a block diagram of the audio source device that is configured to transmit a dual audio stream that includes playback audio and notification audio according to one aspect.

Turning now to FIG. 2, this figure shows a block diagram of the audio source device that is configured to generate and transmit (e.g., via the wireless connection 4 shown in FIG. 1) a dual audio stream that includes playback audio and notification audio according to one aspect. In one aspect, the operations described in this figure may be in response to the audio system 1 outputting an audible notification alert), via the audio output device 3 while the output device is streaming playback audio. For instance, while the audio source device 2 is streaming music to the output device, the source device may also transmit a notification, such as a VPA response in response to sensing a spoken trigger phrase by a listener. As an example, when sensing a trigger phrase of "Hey Hal, do you read me?" that is spoken by a user of the audio source device, the notification may be "How can I help you Dave." As a result of transmitting both the notification and the music, the audio source device and the audio output device may perform one or more operations as describe herein. More about transmitting notifications and the VPA is described herein.

The source device 2 includes a controller 90 may be a special-purpose processor such as an application-specific integrated circuit (ASIC), a general purpose microprocessor, a field-programmable gate array (FPGA), a digital signal controller, or a set of hardware logic structures (e.g., filters, arithmetic logic units, and dedicated state machines). The controller is configured to generate and transmit a dual audio stream, as described herein. More about the operations performed by the controller is described herein. In one aspect, operations performed by the controller may be implemented in software as instructions stored in memory of the audio source device (and/or memory of the controller) and executed by the controller and/or may be implemented by hardware logic structures. In one aspect, the source device may include more elements, such as memory elements, one or more microphones, one or more speakers, and/or one or more display screens.

As illustrated, the controller 90 may have one or more operational blocks, which may include a playback audio encoder 12, a notification audio encoder 13, a packetizer 14, and a volume control 15.

The controller 90 is configured to receive playback audio 20, as a playback audio signal that may contain program audio, such as music, a podcast, or a movie soundtrack. For example, (e.g., a processor or the controller 90 of) the audio source device may be running a media player software application that is retrieving and providing the playback audio to the controller. For instance, the playback audio may be retrieved from local memory (e.g., of the audio source device 2) and/or from another electronic device. In this case, the playback audio signal may be streamed from a local device (e.g., communicatively coupled via wire or a local area network) or a remote electronic device (e.g., via the Internet), such as a remote server. In one aspect, the playback audio signal may be a single (mono) audio channel. In another aspect, the playback audio may be a two-channel input, namely left and right channels of a stereophonic recording of a musical work, or there may be more than two audio channels, such as for example the entire audio soundtrack in 5.1-surround format of a motion picture film or movie. In one aspect, the playback audio may be digital audio (e.g., in the form of one or more audio frames), or analog audio.

In one aspect, the playback audio signal may include other audio content. For example, the signal may include a downlink signal that is obtained by the audio system 1 during a telephone call with another electronic device.

The controller 90 may also be configured to receive notification audio 21, as one or more notification (audio) signals that contain an audible notification. For example, (e.g., a processor or the controller 90 of) the audio source device may be running a software application that is configured to retrieve and provide notification audio, such as a calendar application, an alarm application, a navigation application, and/or a VPA application. For example, the alarm application may determine that an alarm notification is to be outputted at a particular time (e.g., the alarm notification indicating that "It is 10 o'clock"). At that time, the application may retrieve the notification audio 21 and provide the audio to the controller 90. In another aspect, the notification audio 21 may be provided (or retrieved by the controller 90) in response to user input. For example, the VPA application may be configured to monitor one or more microphone signals captured by one or more microphones (which are not shown, but may be a part of the audio source device 2, the audio output device 3, and/or a separate electronic device) that are arranged to convert sensed speech into microphone signals. The VPA application may be configured to analyze the signals in order to identify (e.g., recognize) the speech contained therein. In one aspect, the speech may be a trigger phrase, question, and/or command. In response, to the identified speech the VPA application may retrieve a suitable vocal response as the notification audio. For example, when the identified speech that is spoken by a user of the audio source device is a question, such as "What time is it?", the notification audio retrieved by the VPA application (e.g., from local memory or a remote source, such as a remote server) may include a response to the question, such as "It is 10 o'clock."

In one aspect, the playback audio signal 20 and/or notification audio signal 21 may be digital audio (e.g., Pulse-Code Modulation (PCM) audio, etc.). In another embodiment, the signals may be analog or optical audio signals, in which case the controller may include a codec that is configured to convert these signals into digital form.

The playback audio encoder 12 and the notification audio encoder 13 are configured to encode the playback audio signal 20 and notification audio signal 21, respectively. Although illustrated as being two separate encoders, they may be composed of a single encoder (e.g., programmed processor). The playback audio encoder 12 is configured to receive at least a portion (e.g., one or more audio frames) of the playback audio signal 20 (e.g., from local memory), and is configured to encode the playback audio signal to produce an encoded playback audio signal 22. Specifically, the encoder 12 may encode each frame of the playback audio signal 20 into an encoded playback audio frame. In one aspect, the encoder 12 may encode the playback audio signal using any suitable audio codec, such as, e.g., Advanced Audio Coding (AAC), MPEG Audio Layer II, MPEG Audio Layer III, or Free Lossless Audio Codec (FLAC). The notification audio encoder 13 is configured to receive at least a portion (e.g., one or more audio frames) of the notification audio signal 21, and is configured to encode the notification audio signal to produce an encoded notification audio signal 23, In one aspect, both encoders 12 and 13 may encode their respective audio signals according to the same audio codec (e.g., AAC). In another aspect, each of the encoders may use a different audio codec (e.g., the playback audio encoder 12 using MPEG Audio Layer II, while the notification audio encoder 13 uses AAC).

In one aspect, each of the encoders 12 and 13 may encode (or compress) their respective audio signals differently. Specifically, the playback audio encoder 12 may compress the playback audio signal 20 more than the notification audio encoder 13 compresses the notification audio signal 21. Thus, the encoded playback audio signal 22 may have a lower compression bit rate than a compression bit rate of the encoded notification audio signal 23. In one aspect, the encoders may compress their respective audio signals before encoding them according to a particular (or predefined) codec, such as AAC.

In one aspect, the encoders may determine the compression bit rate of both signals based predefined (or threshold) bit rates (e.g., as defined in a data structure that is stored in local memory). For instance, the playback encoder may encode at a first predefined bit rate, while the notification encoder may encode at a second different predefined bit rate. In another aspect, the encoders may determine the compression bit rate for their respective signals based on the wireless connection between the two devices. As one example, both encoders may compress both signals based on a predetermined bit rate associated with the wireless connection. For example, a BLUETOOTH connection (of which both are communicatively coupled) may have a threshold bit rate of approximately 345 Kbps (e.g., based on the sampling rate). In this case, the playback encoder 12 and the notification encoder 13 may compress their respective audio signals such that the combination has a bit rate that is less than or equal to the threshold bit rate of the connection. In addition, the playback encoder may compress the playback audio at a lower compression rate than the notification rate, while maintaining the combined bit rate below the threshold. In one aspect, the playback audio 20 may be compressed with a lower bit rate than to the notification audio to provide the notification with a higher sound quality than the playback audio, which will have a lower volume level during playback at the audio output device, as described herein. As yet another example, the compression bit rates may be based on the codec that both encoders use to compress their respective audio signals for BLUETOOTH transmission, such that a combination of the bit rates of the compressed audio signals is not greater than a threshold bit rate associated with the codec.

In one aspect, one or both of the encoders 12 and 13 may dynamically adjust its associated compression rate. For example, either of the encoders may adjust its rate of compression based on the bandwidth or available throughput of the wireless (e.g., BLUETOOTH) connection. In one aspect, "bandwidth" may correspond to an amount of data that can be sent from the audio source device to the audio receiver device in a certain period of time. In another aspect, as described herein, bandwidth or available throughput may correspond to a data bit rate (or throughput) that is necessary for the source device 2 to transmit audio data to the output device in order for the receiver device to render and output the audio data. During data transfer, however, this bandwidth or available throughput may change. For example, the bandwidth may vary depending on how many other devices are wirelessly communicating with the audio source device and/or the audio output device. As another example, throughput may change based on various environmental factors (e.g., network interference, etc.). In one aspect, the (e.g., encoders of the) audio source device may be configured to determine the (current) bandwidth or throughput of the wireless connection for transmitting data to the audio output device. In some aspects, the device may use any (known or unknown) method to make this determination. For example, the audio source device may determine the throughput based on a round-trip time after transmitting one or more data packets. Based on the determined bandwidth, each of the encoders 12 and 13 may determine its respective compression bit rate. In another aspect, the encoders may adjust their respective bit rates based on changes to the audio source device's throughput. For example, the controller 90 (or either of the encoders) may determine that there is a reduction in available bandwidth or throughput for transmitting (e.g., audio data, such as a dual audio stream, as described herein) over the wireless connection. This reduction may be based on any of the examples described herein upon determining that there is a reduction, at least one of the encoders may adjust its respective compression bit rate. Conversely, however, if the throughput increases the encoders may increase their respective compression rates. Thus, in response to determining changes in the wireless connection, the encoders may adjust the compression rates.

In another aspect, the playback audio signal 20 and/or the notification audio signal 21 are encoded by their respective encoders at 100% volume level. Specifically, the encoded signals 22 and 23 are at a same volume level as their original signals 20 and 21, respectively. Thus, the controller 90 encodes the signals 20 and 21 without applying scalar gains to increase or attenuate the signals. In another aspect, the controller may not perform any other audio signal processing operations (e.g., applying audio filters to spectrally shape the signals, etc.). In some aspects, each of the encoded audio signals 22 and/or 23 may be at the 100% volume level, regardless of the size (e.g., word length) of each of the signal's audio frames. In another aspect, encoding at 100% volume level may include encoding the signals at 0 dBFS, which represents the highest loudness level of the signals before clipping occurs.

The volume control 15 is configured to receive a user volume setting 25 from the audio output device 3 (e.g., over the wireless connection 4). Specifically, the volume control 15 may receive the user volume setting (e.g., a percentage value, a gain value, etc. from the audio output device 10 via the wireless connection 4. In one aspect, the volume control 15 may receive the user volume setting when a volume input (e.g., input 49 shown in FIG. 3) of the audio output device is changed by a user (e.g., based on user input at the audio output device). In another aspect, the volume setting may be received periodically (e.g., every ten seconds) from the audio output device (e.g., without user intervention). In another aspect, the volume control may receive the user volume setting based on user input at the audio source device 2. In this case, the user of the audio source device 2 (and of the audio output device 3) may adjust the user volume setting at the audio source device based on user input (e.g., adjusting a physical control, such as a knob, etc.).

The volume control 15 is configured to determine different volume levels for the playback audio and the notification audio. In particular, the volume control may determine a playback (first) volume level 28 for the playback audio and a notification (second) volume level 30 for the notification audio based on the received user volume setting. In one aspect, the playback volume level is determined to be less than the notification volume level. In another aspect, the notification volume level may be greater than the playback volume level and less than or equal to the user volume setting. In one aspect, the playback volume level and the notification volume level determined by the volume control 15 are to be applied to the playback audio and notification audio, respectively by the audio output device, as described herein. In one aspect, the volume levels are to be applied to (at least portions of) the playback and notification audio that are to be played back (e.g., mixed together and outputted) contemporaneously. In one aspect, the volume control may determine relative volume levels of both the playback audio and the notification audio based on the user volume setting 25 of the audio output device (and/or the audio source device). In one aspect, the volume control may define the notification volume level as equivalent to (or equal to) the user volume setting, while the first volume level is a reduction of the user volume setting. For example, when the user volume setting is indicated to be 60%, the notification volume setting may be defined as 60%, while the playback volume level may be defined at 5%. In another aspect, both volume levels may be defined based on a percentage of the user volume setting. For instance, the notification volume level may be 90% of the user volume setting, while the playback volume level may be 10% of the user volume setting. In yet another aspect, both volume levels may be predefined volume levels.

The packetizer 14 is configured to receive the encoded playback audio signal 22 and the encoded notification audio signal 23, and is configured to receive the playback volume level 28 and the notification volume level 30. In one aspect, the volume levels received by the packetizer are to be applied to the audio signals received from encoders 12 and 13. The packetizer 14 is also configured to generate one or more playback (first) data packets each of which including at least a portion of the encoded playback audio signal (e.g., one or more encoded audio frames) as playback data and the (e.g., current) playback volume level 28 (which may be stored as metadata in the packet's header). In addition, the packetizer 14 is configured to generate one or more notification (second) data packets each of which including at least a portion of the encoded notification audio (e.g., one or more encoded audio frames) as notification data and the (e.g., current) notification volume level 30 (which may be stored as metadata in the packet's header). In one aspect, each of the packet's headers may also include additional metadata, such as a synchronization number, timestamp, the volume of the data stored therein, the codec type used by encoders 12 and 13, etc.

The audio source device 2 is configured to transmit, over the wireless connection 4, the data packets generated by the packetizer 14 as a dual audio stream 24 to the audio output device 3. Specifically, a wireless transceiver (e.g., radio frequency (RF) transceiver of the BLUETOOTH hardware lower stack) of the audio source device 2 (not shown) may receive the generated data packets from the packetizer 14 and wirelessly transmit the data packets as the dual audio stream. In one aspect, the two types of data packets may be interweaved within the dual audio stream, such as a notification packet is positioned between two playback packets, as shown in this figure. As shown, the first packet (on the far right) is a playback data packet that includes playback data and an associated volume level, followed by a notification data packet that includes notification data and an associated volume level. This pattern is then repeated, thereby creating the dual audio stream 24. In another aspect, the data packets may be transmitted in groups (or chunks). In another aspect, the data packets may be transmitted in any order and/or configuration. As described herein, the playback audio and the notification audio contained within the dual audio stream are transmitted to the audio output device 3 for synchronized output.

Figure 3:
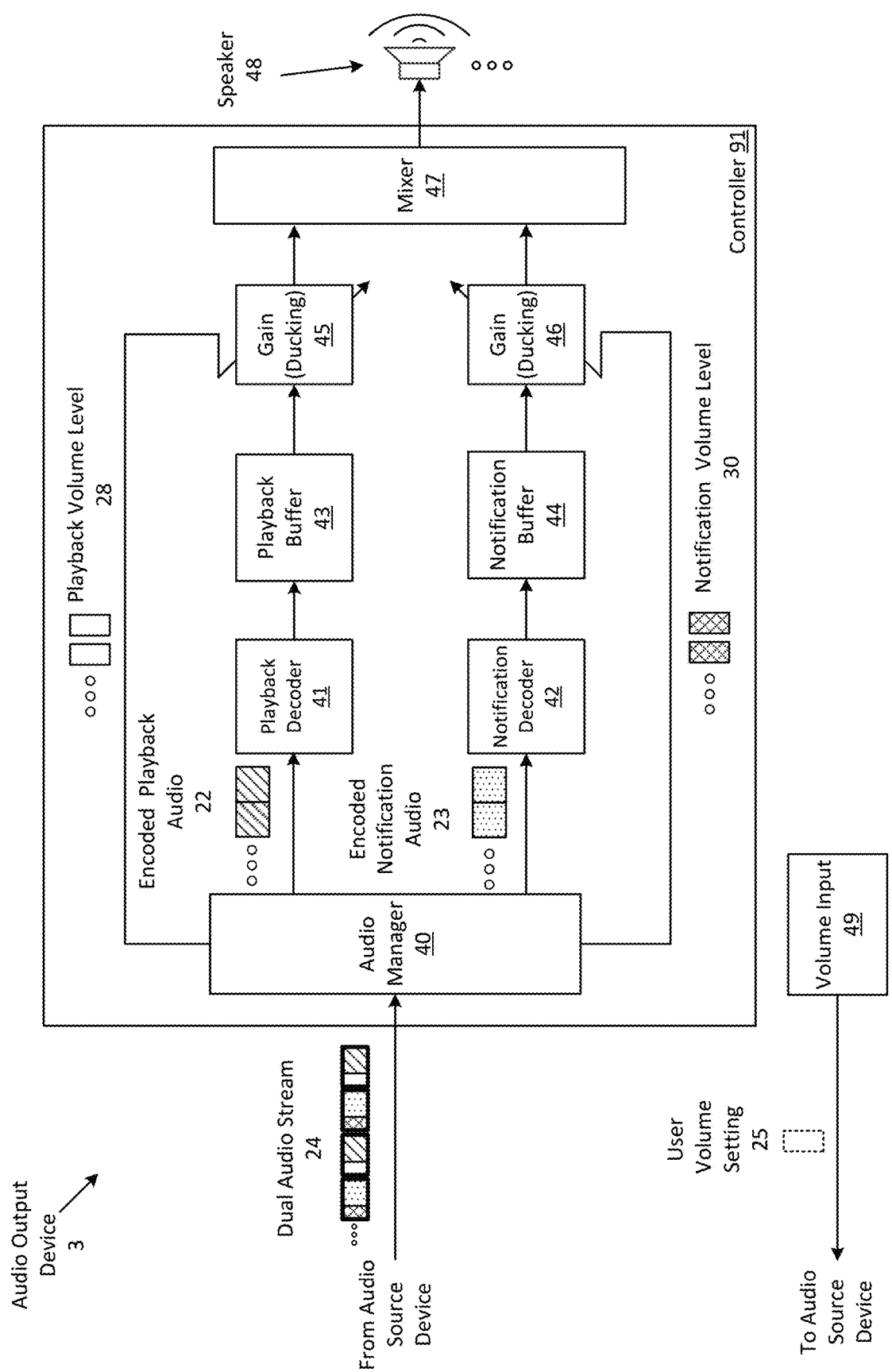
FIG. 3 shows a block diagram of an audio output device that is configured to receive the dual audio stream and output the playback audio and notification audio according to another aspect.

FIG. 3 shows a block diagram of an audio output device 3 that is configured to receive the dual audio stream 24 and output the playback audio and notification audio according to another aspect. This figure shows that the audio output device includes a controller 91, one or more speakers 48, and a volume input (device) 49. In one aspect, the audio output device may include more or less elements, such as including one or more microphones.

In one aspect, the controller 91 is configured to receive the dual audio stream 24, perform one or more audio signal processing operations upon one or both of the audio signals contained within the stream, and output the audio signals (e.g., as a mix). As shown, the controller 91 may have one or more operational blocks, which may include an audio manager 40, a playback decoder 41, a notification decoder 42, a playback buffer 43, a notification buffer 44, a (e.g., playback) gain stage 45, a (e.g., notification) gain stage 46, and a mixer 47.

The audio manager 40 is configured to receive the dual audio stream 24 from the audio source device 2 (e.g., via a wireless transceiver of the output device, not shown). The audio manager 40 is configured to extract the audio data and metadata from the stream. Specifically, the manager extracts the encoded playback audio signal 22 (e.g., as one or more encoded playback audio frames) and the encoded notification audio signal 23 (e.g., as one or more encoded notification audio frames), contained within the dual audio stream 24. The audio manager is also configured to extract metadata from each data packet's header. For example, the audio manager extracts a playback volume level 28 from each playback audio packet and a notification volume level 30 from each notification audio packet. More about the volume levels is describe herein.

The playback decoder 41 and the notification decoder 42 are configured to decode the encoded playback audio signal 22 and the encoded notification audio signal 23, respectively, which were encoded using any suitable audio codec, as described herein. Although illustrated as being separate blocks, operations of both decoders may be performed by a single decoder that is configured to decode one or more audio signals. The playback decoder 41 is configured to receive the encoded playback audio signal 22 from the audio manager 40 and is configured to decode the signal, producing a decoded playback audio signal. Similarly, the notification decoder 42 is configured to receive the encoded notification audio signal 23 from the audio manager 40 and is configured to decode the signal, producing a decoded notification audio signal. In one aspect, each of the decoded audio signals and/or may maintain the same compression bit rate, as the encoded audio signals 22 and 23, respectively. Thus, the decoded playback audio signal may have a lower compression bit rate as a compression bit rate of the decoded notification audio signal, as described herein. The playback buffer 43 is configured to receive and store the decoded playback audio signal, and the notification buffer 44 is configured to receive and store the decoded notification audio signal. Specifically, each of the buffers may store audio frames of each buffer's respective audio signal.

As described herein, the audio output device 3 is configured to duck at least one of the playback audio and the notification audio for output through one or more speakers 48. Specifically, the (playback) gain 45 is configured to receive or extract (e.g., one or more audio frames of) buffered playback audio signal from the playback buffer 43 and is configured to adjust a signal level of (e.g., by applying a first scalar gain value to) the buffered signal to produce a (first) gain-adjusted audio signal. Similarly, the (notification) gain 46 is configured to receive or extract (e.g., one or more audio frames of) buffered notification audio signal from the notification buffer 44 and is configured to adjust a signal level of (e.g., by applying a second scalar gain value to) the buffered signal to produce a (second) gain-adjusted audio signal. In one aspect, each of the gains are configured to receive audio frames of respective audio signals for synchronized output (or playback) by the audio output device.

In one aspect, each of the gains 45 and 46 are configured to adjust their associated scalar gain values based on volume levels that are contained within the dual audio stream 24. In particular, the gain 45 is configured to receive a playback volume level 28 that is extracted from the dual audio stream 24 by the audio manager, and is configured to set (or define) the associated first scalar gain value based on the playback volume level. Similarly, the gain 46 is configured to receive a notification volume level 30 that is extracted from the dual audio stream 24 by the audio manger 40, and is configured to set (or define) the associated second scalar gain value based on the notification volume level. In one aspect, the scalar gain value is proportional to the volume level. Thus, as a volume level increases, the scalar gain value may increase.

In one aspect, both gains 45 and 46 may be based on respective volume levels that are contained within the dual audio stream 24. For example, gain 45 may be defined by a playback volume level 28 that is extracted from a most-recently received playback packet, and gain 46 may be defined by a notification volume level 30 that is extracted from a most-recently received notification placket by the audio manager 40. As a result, the gain of audio frames extracted from buffers 43 and 44 may be adjusted by gains 45 and 46, respectively, according to a most-recently extracted volume level. Thus, the gains may be adjusted in real-time based on changes in volume levels within the dual audio stream 24. This is in contrast with conventional methods in which volume changes are experienced by the user of the audio output device only after the long buffer is depleted, as described herein. As a result, the present disclosure reduces (or eliminates) this latency.

In another aspect, the scalar gain values of the gains 45 and/or 46 may be based on a current portion of a respective audio signal that is being gain-adjusted by the gains. For example, the gain 45 may be defined by a volume level 28 that is associated with a portion of the playback audio signal that is retrieved from the playback buffer 43 and is being gain adjusted by the gain 45. For example, the volume level may have been associated with the portion of the playback audio signal received within the dual audio stream 24 (e.g., within one or more playback data packets).

The mixer 47 is configured to receive the gain-adjusted audio signals from the gains 45 and/or 46, and is configured to mix both signals to produce a mixed (output) audio signal. In one aspect, the mixer may perform matrix mixing operations that mixes and/or routes the audio signals to one or more outputs, such as speaker 48. In one aspect, the mixer 47 may perform digital and/or analog mixing operations.

In another aspect, the mixer 47 may spatially render the received audio signals, such that one or more sounds contained within are experienced by the user as different sound sources. For example, the mixer 47 may apply spatial (e.g., head-related transfer functions (HRTFs)) that are personalized for the user of the output device 3 in order to account for the user's anthropometrics. In this case, the mixer 47 may produce binaural audio signals, a left signal for the left speaker (e.g., of a left earphone of the headset 3) and a right signal for the right speaker (e.g., speaker 48), which when outputted through respective speakers produces a 3D sound (e.g., gives the user the perception that sounds are being emitted from a particular location within an acoustic space). In one aspect, when there are multiple sounds, the mixer may apply spatial filters separately to each (or a portion of the sounds) and then mix the spatially filtered sounds into a set of mixed signals.

Although each of the computational blocks are illustrated as being contained within (e.g., being performed by) the controller 91, one or more may be separate electronic devices. For example, at least one of the buffers 43 and 44 may be separate memory devices, which is communicatively coupled with the controller 91. As another example, the mixer 57 may be a separate audio processor.

The volume input 49 is configured to determine (define or set) the user volume setting 25 at the audio output device 3. In one aspect, the volume input may determine the user volume setting based on user input at the audio output device. For example, the volume input 49 may be an input device, such as a physical volume control (e.g., knob) that is configured to set the volume setting in response to receiving input from a user (e.g., twisting the volume knob). For instance, the volume setting may be based on an amount of rotational movement of the volume knob. In another aspect, the volume input may be one or more user interface (UI) controllers that may be displayed on a display screen (e.g., of the audio source device and/or of the audio output device). As shown, the audio output device 3 transmits (e.g., over a wireless connection, which may be the same connection through which the dual audio stream is received) the user volume setting 25 (defined by the volume input 49) to the audio source device. In one aspect, the audio output device may transmit the setting in response to the volume input receiving user input to adjust the user volume setting. As another example, the output device may transmit the setting periodically.

Figure 4:
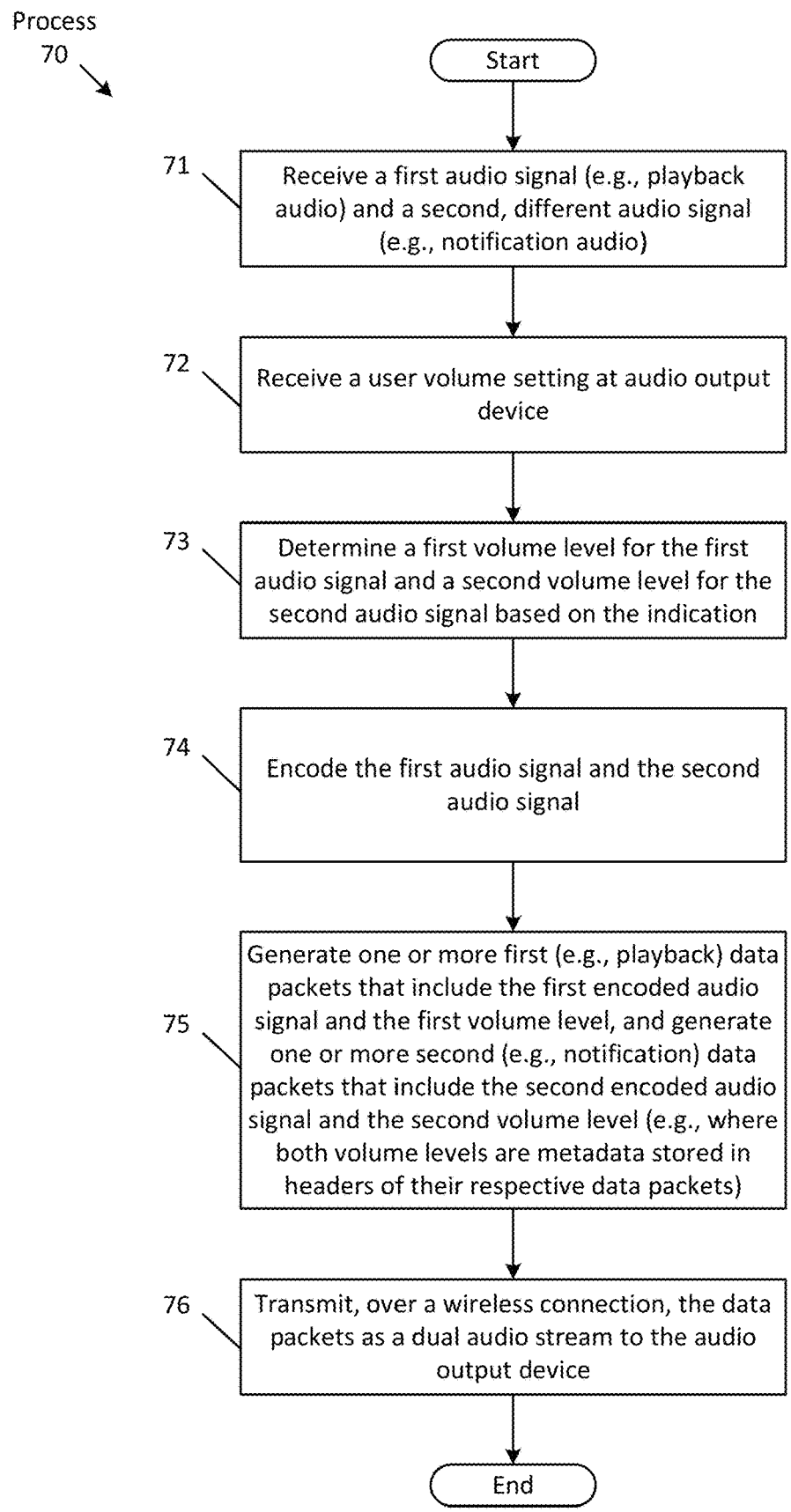
FIG. 4 is a flowchart of one aspect of a process to transmit the dual audio stream.
Figure 5:
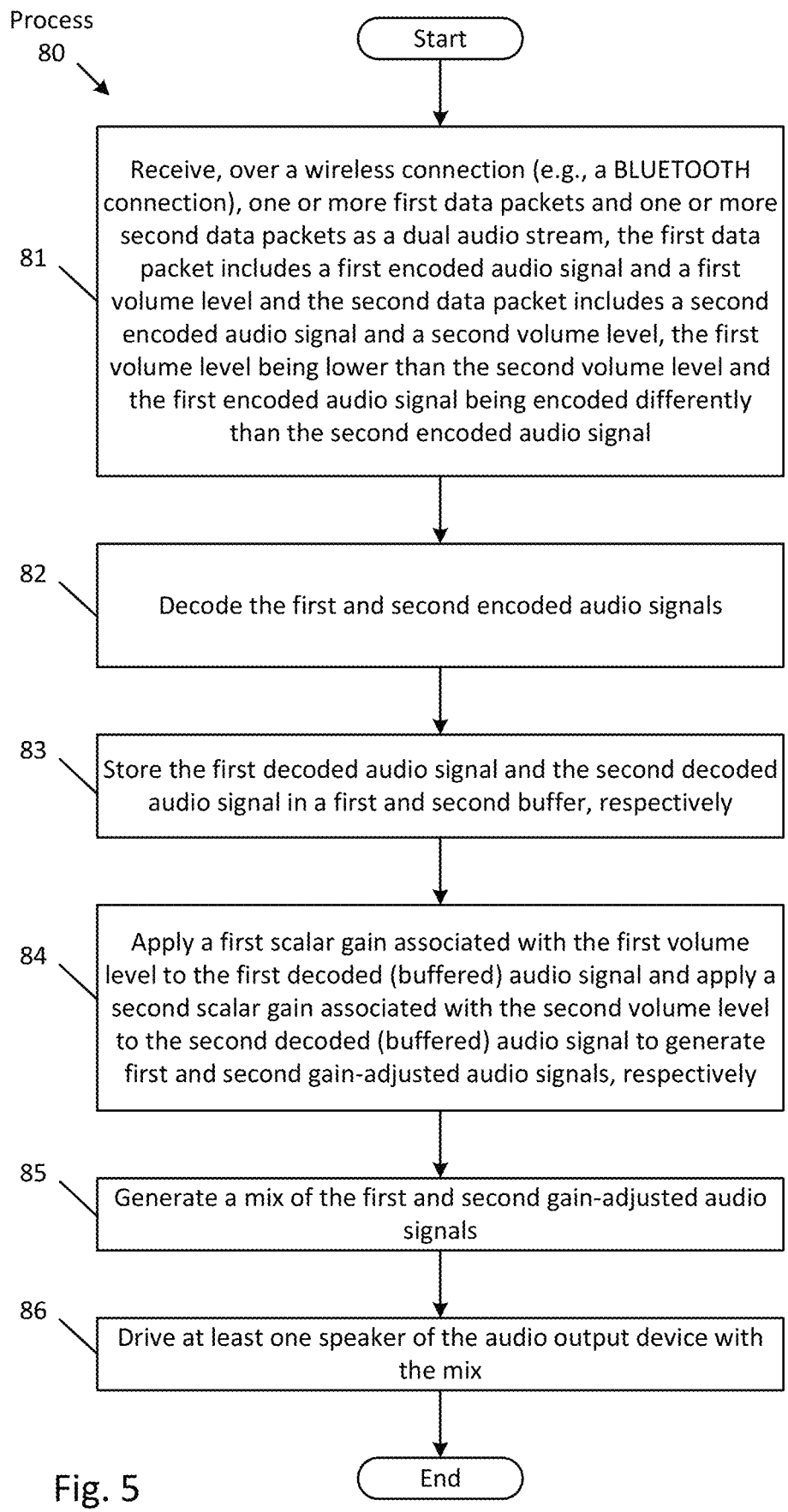
FIG. 5 is a flowchart of one aspect of a process to receive the dual audio stream and output the audio contained therein.

FIGS. 4 and 5 are flowcharts of processes 70 and 80, respectively, for performing audio ducking for headsets. In one aspect, the processes are performed by the audio system 1. For instance, process 70 may be performed by the (e.g., controller 90 of the) audio source device 2, while process 80 may be performed by the (e.g., controller 91 of the) audio output device 3. Thus, these figures will be described with reference to FIGS. 1-3.

Regarding FIG. 4, this figure is a flowchart of one aspect of the process 70 to transmit the dual audio stream 24. The process 70 begins by the controller 90 receiving a first audio signal (e.g., playback audio 20) and a second, different audio signal (e.g., notification audio 21) (at block 71). The controller 90 receives a user volume setting (e.g., volume level) at the audio output device 3 (at block 72). For example, the controller 90 may receive the volume setting from the audio output device (e.g., over the wireless connection 4). The controller 90 determines a first volume level for the first audio signal and a second volume level for the second audio signal based on the user volume setting (at block 73). As described herein, the volume control 15 is configured to determine the volume levels of the playback audio signal and the notification audio signal based on the user volume setting (or level) at the audio output device.

The controller 90 encodes the first audio signal (e.g., as a first encoded audio signal) and encodes the second audio signal (e.g., as a second encoded audio signal) (at block 74). Specifically, the signals may be encoded by compressing the signals according to different compression bit rates. For example, the playback audio encoder 12 may compress (e.g., each audio frame associated with) the first audio signal at a first compression bit rate and the notification audio encoder 13 may compress (e.g., each audio frame associated with) the second audio signal at a second, different compression bit rate, where the first compression bit rate is lower than the second compression bit rate. The controller 90 generates one or more first (e.g., playback) data packets that include (e.g., different portions of) the first encoded audio signal and the first volume level, and generates one or more second (e.g., notification) data packets that include (e.g., different portions of) the second encoded audio signal and the second volume level, where both volume levels are metadata stored in headers of their respective data packets (at block 75). In one aspect, each of the (e.g., playback and/or notification) data packets include one or more audio frames of the respective audio signal. The controller 90 transmits, over a wireless connection (e.g., connection 4 of FIG. 1), the data packets as a dual audio stream 24 to the audio output device 3 (at block 76). In one aspect, the audio output device is configured to process the encoded first and second audio signals contained within the dual audio stream according to their respective volume levels to produce a mixed audio signal for output through one or more speakers. More about the operations of the audio output device is described herein.

In one aspect, the controller 90 of the audio source device 2 may perform at least some of the operations of process 70 for each of several portions (e.g., audio frames) of both first and second audio signals. As a result, the controller 90 may dynamically adapt data to be transmitted within the dual audio stream based on changes within the audio system. For example, for a first obtained portion of both audio signals (e.g., a first audio frame of the first audio signal and a first audio frame of the second audio signal), the controller 90 may determine respective volume levels based on a received user volume setting from the audio output device 3. For a second subsequently received portion of either of the first and second audio signals, however, the received user volume setting may be different than the previously received user volume setting (e.g., based on user input by the user at the audio output device to reduce the volume). As a result, the controller of the audio source device may determine different volume levels for the second subsequently obtained portion based on this change. Similarly, the controller of the audio source device may dynamically adapt the encoding of the audio signals based on changes within the audio system, as described herein.

FIG. 5 is a flowchart of one aspect of the process 80 to receive the dual audio stream 24 and output the audio (e.g., via speaker 48) contained therein. The process 80 begins by the controller 91 of the audio output device 3 receiving, over a wireless connection (e.g., a BLUETOOTH connection, such as the connection 4 illustrated in FIG. 1), one or more first data packets and one or more second data packets as the dual audio stream 24 from the audio source device, the first data packet(s) including a first encoded audio signal and a first volume level and the second data packet(s) including a second encoded audio signal and a second volume level, where the first volume level is lower than the second volume level and the first encoded audio signal is encoded differently than (e.g., having a lower compression bit rate than a compression bit rate of) the second encoded audio signal (at block 81).

The controller 91 decodes the first and second encoded audio signals, producing a first decoded audio signal and a second decoded audio signal, respectively (at block 82). The controller 91 stores the decoded audio signals in first and second buffers (e.g., playback buffer 43 and notification buffer 44 of FIG. 3), respectively (at block 83). The controller 91 applies a first scalar gain associated with the first volume level to the first decoded audio signal and applies a second scalar gain associated with the second volume level to the second decoded audio signal to generate first and second gain-adjusted audio signals, respectively (at block 84). For example, the controller 91 may retrieve (e.g., one or more audio frames of) the decoded playback audio signal stored within the playback buffer 43 and may retrieve (e.g., one or more audio frames of) the decoded notification audio signal stored within the notification buffer 44. In one aspect, the controller 91 may retrieve audio frames that are for synchronized playback by the audio output device (e.g., portions of audio signals that are to be mixed together and played back at the same time). As described herein, the volume levels may be associated with data packets that have been most-recently received within the dual audio stream. Thus, in one aspect, the volume levels may be different than volume levels that were contained within the same data packets as the retrieved audio frames (e.g., in a previously received portion of the dual audio stream 24). In another aspect, however, the volume levels may be the same (or similar) to the volume levels contained within the same data packets that had contained the retrieved audio frames when received within the dual audio stream. The controller 91 generates a mixed audio signal (or mix) of the first and second gain-adjusted audio signals (at block 85). The controller 91 drives at least one speaker (e.g., speaker 48) of the audio output device 3 with the mix (at block 86).

Some aspects may perform variations to the processes 70 and 80 described herein. For example, the specific operations of at least some of the processes may not be performed in the exact order shown and described. The specific operations may not be performed in one continuous series of operations and different specific operations may be performed in different aspects.

In one aspect, at least some of the operations of processes 70 and 80 may be performed by the audio system 1 in response to receiving user input. For example, and as described herein, a notification application (e.g., a VPA application) executing within the (e.g., audio source device 2 of the) audio system may receive user input, such as a voice command, question, and/or trigger phrase. In response, the audio source device may obtain (or retrieve) the second audio signal (e.g., from the notification audio source 11), which may contain an audible response to the user input. In another aspect, the processes may automatically be performed by the notification application (e.g., based upon a determination that an audible notification needs to be outputted by the audio output device). For example, a calendar application may determine that an audible reminder (e.g., an alarm sound) needs to be outputted at a particular time of day.

In another aspect, these processes may be performed while the audio system 1 is outputting the first audio signal, which may be a playback audio signal (e.g., containing music). In that case, the audio source device may obtain the first audio signal and stream the signal to the audio output device for playback. In response to determining that an audible notification needs to be outputted, the audio source device may obtain the second audio signal, which may be a notification audio signal at block 71 and proceed with the remaining operations to transmit a dual audio stream to the audio output device. As a result, once the second audio signal is (e.g., entirely) transmitted to the audio output device, the audio source device may continue streaming the first audio signal to the audio output device.

Personal information that is to be used should follow practices and privacy policies that are normally recognized as meeting (and/or exceeding) governmental and/or industry requirements to maintain privacy of users. For instance, any information should be managed so as to reduce risks of unauthorized or unintentional access or use, and the users should be informed clearly of the nature of any authorized use.

As previously explained, an aspect of the disclosure may be a non-transitory machine-readable medium (such as microelectronic memory) having stored thereon instructions, which program one or more data processing components (generically referred to here as a "processor") to perform the network operations and audio signal processing operations, as described herein. In other aspects, some of these operations might be performed by specific hardware components that contain hardwired logic. Those operations might alternatively be performed by any combination of programmed data processing components and fixed hardwired circuit components.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method performed by an audio source device, the method comprising:
receiving a playback audio signal of a piece of audio content and a notification audio signal that comprises an audible notification;
receiving, over a wireless connection and from an audio output device, a user volume level of a volume control of the audio output device;
determining a playback volume level for the playback audio signal and a notification volume level for the notification audio signal based on the user volume level, wherein the notification volume level is equal to or less than the user volume level and the playback volume level is less than the notification volume level;

encoding the playback audio signal and the notification audio signal, wherein encoding comprises compressing the playback audio signal at a first compression bit rate and the notification audio signal at a second compression bit rate that is higher than the first compression bit rate;

generating a playback data packet that comprises the encoded playback audio signal and the playback volume level and a notification data packet that comprises the encoded notification audio signal and the notification volume level; and transmitting, over the wireless connection and to the audio output device, the playback data packet and the notification data packet as a dual audio stream.

2. The method of claim 1, wherein the playback audio signal and the notification audio signal are encoded at a volume level of 0 decibels relative to full scale (dBFS).

3. The method of claim 1, further comprising
determining that there is a reduction in available bandwidth for transmitting the dual audio stream over the wireless connection; and
adjusting at least one of the first and second compression bit rates based on the reduction.

4. The method of claim 1, wherein both of the playback audio signal and the notification audio signal are for synchronized output by the audio output device.

5. The method of claim 1, wherein the audible notification comprises a virtual personal assistant (VPA) response.

6. The method of claim 1, wherein the audio output device is a wireless headset.

7. The method of claim 1, wherein the wireless connection is a BLUETOOTH connection.

8. An audio output device, comprising:
a volume control;
at least one processor; and
memory having instructions stored therein which when executed by the at least one processor causes the audio output device to:
transmit, over a wireless connection, a user volume setting of the volume control to an audio source device;
receive, over the wireless connection and from the audio source device, a first data packet and a second data packet as a dual audio stream, the first data packet comprising a first playback audio signal and a playback volume level and the second data packet comprising a first notification audio signal and a notification volume level, wherein the playback volume level is lower than the notification volume level, wherein the playback volume level and the notification volume level are determined by the audio source device and are based on the transmitted user volume setting;
apply a first scalar gain associated with the playback volume level to a second playback audio signal received prior to the first playback audio signal and apply a second scalar gain associated with the notification volume level to a second notification audio signal received prior to the first notification audio signal to generate first and second gain-adjusted audio signals, respectively; and
drive a speaker of the audio output device with a mix of the first and second gain-adjusted audio signals.

9. The audio output device of claim 8, wherein the first playback audio signal and the first notification audio signal are encoded in their respective data packets, wherein the memory comprises further instructions to:

decode the encoded first playback audio signal and the encoded first notification audio signals;
storing the decoded playback audio signal in a first audio buffer and the decoded notification audio signal in a second audio buffer; and
extracting the second playback audio signal and the second notification audio signal from the first and second audio buffers, respectively.

10. The audio output device of claim 9, wherein the first and second playback audio signals comprise different portions of a playback audio.

11. The audio output device of claim 9, wherein the first playback audio signal is encoded differently than the first notification audio signal by having a lower bitrate.

12. The audio output device of claim 8, wherein the audio output device is a wireless headset.

13. The audio output device of claim 8, wherein the playback volume level is less than the user volume setting and the notification volume level is 1) greater than the playback volume level and 2) less than or equal to the user volume setting.

14. The audio output device of claim 8, wherein the first and second notification audio signals comprise different portions of a virtual personal assistant (VPA) response.

15. An audio source device, comprising:
at least one processor; and
memory having instructions stored therein which when executed by the at least one processor causes the audio source device to:
receive a first playback audio signal and a first notification audio signal,
receive, over a wireless connection and from an audio output device, a user volume setting of the audio output device,
determine a playback volume level for the first playback audio signal and a notification volume level for the first notification audio signal based on the user volume setting, wherein the playback volume level is less than the notification volume level,
encode the first playback audio signal and the first notification audio signal, wherein the first playback audio signal is encoded differently than the first notification audio signal,
generate a first data packet that includes the encoded first playback audio signal and the playback volume level and generate a second data packet that includes the encoded first notification audio signal and the notification volume level, and
transmit, over the wireless connection and to the audio output device, the first and second data packets as a dual audio stream,
wherein the audio output device is configured to:
apply a first gain associated with the playback volume level to a second playback audio signal transmitted in the dual audio stream prior to the first data packet and apply a second gain associated with the notification volume level to a second notification audio signal transmitted in the dual audio stream prior to the second data packet to generate first and second gain-adjusted audio signals, respectively; and
drive a speaker of the audio output device with a mix of the first and second gain-adjusted audio signals.

16. The audio source device of claim 15, wherein the instructions to encode the first playback and first notification audio signals comprises instructions to compress the first playback audio signal according to a first compression bit rate and compress the first notification audio signal according to a second compression bit rate, wherein the first compression bit rate is lower than the second compression bit rate.

17. The audio source device of claim 16, wherein the memory has further instructions to
   determine that there is a reduction in available bandwidth for transmitting the dual audio stream over the wireless connection; and
   adjust at least one of the first and second compression bit rates based on the reduction.

18. The audio source device of claim 15, wherein the first and second playback audio signals comprise different portions of a playback audio that is being streamed from the audio source device to the audio output device via the dual audio stream.

19. The audio source device of claim 15, wherein the first and second notification audio signals comprises a virtual personal assistant (VPA) response.

20. The audio source device of claim 15, wherein the audio output device is a wireless headset.

21. The audio source device of claim 15, wherein the wireless connection is a BLUETOOTH connection.

\* \* \* \* \*